United States Patent
Bekiroglu et al.

(10) Patent No.: US 9,086,969 B2
(45) Date of Patent: Jul. 21, 2015

(54) ESTABLISHING A USEFUL DEBUGGING STATE FOR MULTITHREADED COMPUTER PROGRAM

(75) Inventors: Kaya Bekiroglu, Edmonds, WA (US); Andrew M. Schwerin, Seattle, WA (US); Peter J. Godman, Seattle, WA (US); Mark H. Oskin, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 708 days.

(21) Appl. No.: 12/969,461

(22) Filed: Dec. 15, 2010

(65) Prior Publication Data

US 2011/0179399 A1    Jul. 21, 2011

Related U.S. Application Data

(60) Provisional application No. 61/286,758, filed on Dec. 15, 2009.

(51) Int. Cl.
*G06F 9/44* (2006.01)
*G06F 11/07* (2006.01)
*G06F 11/36* (2006.01)

(52) U.S. Cl.
CPC .............. *G06F 11/079* (2013.01); *G06F 11/36* (2013.01); *G06F 11/3632* (2013.01); *G06F 11/3636* (2013.01)

(58) Field of Classification Search
USPC ............. 714/718, 26, 38.13, 37, 17, 6.12, 15, 714/728, 6, 12, 737; 717/124, 126, 128, 717/129, 135; 719/318; 709/224; 715/700; 702/186
See application file for complete search history.

(56) References Cited

U.S. PATENT DOCUMENTS

| | | | |
|---|---|---|---|
| 6,772,367 B1* | 8/2004 | Tarafdar et al. | 714/11 |
| 7,574,585 B1* | 8/2009 | Nekl et al. | 712/227 |
| 7,958,497 B1* | 6/2011 | Lindo et al. | 717/128 |
| 2002/0120428 A1* | 8/2002 | Christiaens | 702/186 |
| 2003/0097613 A1* | 5/2003 | Kageshima | 714/26 |
| 2003/0121027 A1* | 6/2003 | Hines | 717/135 |
| 2004/0123185 A1* | 6/2004 | Pierce et al. | 714/38 |
| 2007/0043531 A1* | 2/2007 | Kosche et al. | 702/182 |
| 2007/0234157 A1* | 10/2007 | Rajski et al. | 714/728 |
| 2007/0245312 A1* | 10/2007 | Qadeer et al. | 717/124 |
| 2009/0019451 A1* | 1/2009 | Matsuzaki et al. | 718/107 |
| 2009/0177936 A1* | 7/2009 | Koenemann et al. | 714/737 |

OTHER PUBLICATIONS

Singhal et al, "An Efficient implementation of vector clocks" 1992, pp. 47-52 <Singhal_IPL92.pdf>.*
Yuan Yu et al, "Race Track: Efficient Detection of Data Race Conditions via Adaptive Tracking", SOSP Oct. 2005, pp. 221-234 <RaceT_Yu05.pdf>.*
Nettles, Scott M. and Jeannette M. Wing,"Persistence+Undoability=Transactions," School of Computer Science, Carnegie Mellon University, 12 pages, Aug. 30, 1991.

* cited by examiner

*Primary Examiner* — Tuan Vu
(74) *Attorney, Agent, or Firm* — Perkins Coie LLP

(57) ABSTRACT

A facility for supporting the analysis of a multithreaded program is described. For each of a number of threads of the multithreaded program, the facility identifies a semantically meaningful point in the execution of the thread. The facility interrupts the execution of each thread at the point identified for the thread.

29 Claims, 8 Drawing Sheets

| absolute time | thread execution | | | | | | clock vectors | | | |
|---|---|---|---|---|---|---|---|---|---|---|
| | thread a | | thread b | | thread c | | thread a | thread b | thread c | page 1 | page 2 |

| absolute time | thread a local time | instruction | thread b local time | instruction | thread c local time | instruction | thread a | thread b | thread c | page 1 | page 2 |
|---|---|---|---|---|---|---|---|---|---|---|---|
| 0 | 0a | | 0b | | 0c | | <0a, 0b, 0c> | <0a, 0b, 0c> | <0a, 0b, 0c> | <0a, 0b, 0c> | <0a, 0b, 0c> |
| 1 | 1a | write A (page 1) | | | | | <1a, 0b, 0c> | | | <1a, 0b, 0c> | |
| 2 | 2a | write D (page 2) | 1b | read A (page 1) | | | <2a, 0b, 0c> | <0a, 1b, 0c><br><1a, 1b, 0c> | | | <2a, 0b, 0c> |
| 3 | | | 2b | read B (page 2) | | | | <1a, 2b, 0c> | | | |
| 4 | 3a | write C (page 1) | | | 1c | read B (page 2) | <3a, 0, 0> | | <0a, 0b, 1c><br><2a, 2b, 1c> | <3a, 0b, 0c> | <2a, 2b, 0c> |
| 5 | | | 3b | read C (page 1) | 2c | CRASH! | | <1a, 3b, 0c><br><3a, 3b, 0c> | <2a, 2b, 2c> | | |

*FIG. 5*

| abs. time | thread execution | | | | | clock vectors | | | | | |
|---|---|---|---|---|---|---|---|---|---|---|---|
| | thread a | | thread b | | thread c | | thread a | thread b | thread c | A | B | C | D |
| | local time | instruction | local time | instruction | local time | instruction | | | | | | | |
| 0 | 0a | | 0b | | 0c | | <0a, 0b, 0c> | <0a, 0b, 0c> | <0a, 0b, 0c> | <0a, 0b, 0c> | <0a, 0b, 0c> | <0a, 0b, 0c> | <0a, 0b, 0c> |
| 1 | 1a | write A | | | | | <1a, 0b, 0c> | | | <1a, 0b, 0c> | | | |
| 2 | 2a | write D | 1b | read A | | | <2a, 0b, 0c> | <0a, 1b, 0c><br><1a, 1b, 0c> | | | | | <2a, 0b, 0c> |
| 3 | | | 2b | write B | | | | <1a, 2b, 0c> | | | <1a, 2b, 0c> | | |
| 4 | 3a | write C | | | 1c | read B | <3a, 0b, 0c> | | <0a, 0b, 1c><br><1a, 2b, 1c> | | | <3a, 0b, 0c> | |
| 5 | | | 3b | read C | 2c | CRASH! | | <1a, 3b, 0c><br><3a, 3b, 0c> | <1a, 2b, 2c> | | | | |

*FIG. 6*

| abs. time | thread execution | | | | | | tracking | | | | |
|---|---|---|---|---|---|---|---|---|---|---|---|
| | thread a | | thread b | | thread c | | thread a | | thread b | | thread c | |
| | local time | instruction | local time | instruction | local time | instruction | clock | CW list | clock | CW list | clock | CW list |
| 0 | 0a | write A | 0b | | 0c | | <0a, 0b, 0c> | | <0a, 0b, 0c> | | <0a, 0b, 0c> | |
| 1 | 1a | write B | | | | | <1a, 0b, 0c> | | | | | |
| 2 | 2a | write C | | | | | <2a, 0b, 0c> | | | | | |
| 3 | 3a | | | | | | <3a, 0b, 0c> | | | | | |
| 4 | | | 1b | read C | | | | | <0a, 1b, 0c> <3a, 1b, 0c> | {3a} | | |
| 5 | | | 2b | read B | | | | | <3a, 2b, 0c> | {2a, 3a} | | |
| 6 | | | 3b | write D | | | | | <3a, 3b, 0c> | | | |
| 7 | | | | | 1c | read D | | | | | <0a, 0b, 1c> <3a, 3b, 1c> | {2a, 3a, 3b} |
| 8 | | | | | 2c | CRASH! | | | | | <3a, 3b, 2c> | |

*FIG. 7A* ically incorporated in at least some of the computer sys-
ESTABLISHING A USEFUL DEBUGGING STATE FOR MULTITHREADED COMPUTER PROGRAM

CROSS-REFERENCE TO RELATED APPLICATIONS

This application claims the benefit of U.S. Provisional Application No. 61/286,758, filed Dec. 15, 2009, which is hereby incorporated by reference in its entirety.

This application is related to the following applications, each of which is hereby incorporated by reference in its entirety: U.S. Provisional Application No. 61/013,019, filed Dec. 12, 2007; U.S. application Ser. No. 12/334,336, now U.S. Patent Application No. US 2009/0165006, filed Dec. 12, 2008; U.S. Provisional Application No. 61/035,490, filed Mar. 11, 2008; and U.S. application Ser. No. 12/402,395, now U.S. Patent Application No. US 2009/0235262, filed Mar. 11, 2009.

TECHNICAL FIELD

The described technology is directed to the field of software development and testing techniques, and, more particularly, to the field of debugging techniques.

BACKGROUND

A debugger is a software development and testing tool that monitors the behavior and state of a program as it executes. For example, some debuggers track the position in the program at which the computer system is executing the program, and/or track the values of at least some of the variables accessed by the program. Some debuggers are capable of simultaneously monitoring each thread of a multithreaded program.

BRIEF DESCRIPTION OF THE DRAWINGS

FIG. 5 is a sample clock vector diagram that shows how the facility maintains clock vectors for a sample program's threads and memory pages accessed by them in some embodiments as part of step 301.

FIG. 6 is a sample clock vector diagram that shows how the facility maintains clock vectors for the sample program's threads and memory words accessed by them in some embodiments as part of step 302.

DETAILED DESCRIPTION

Figure 1:
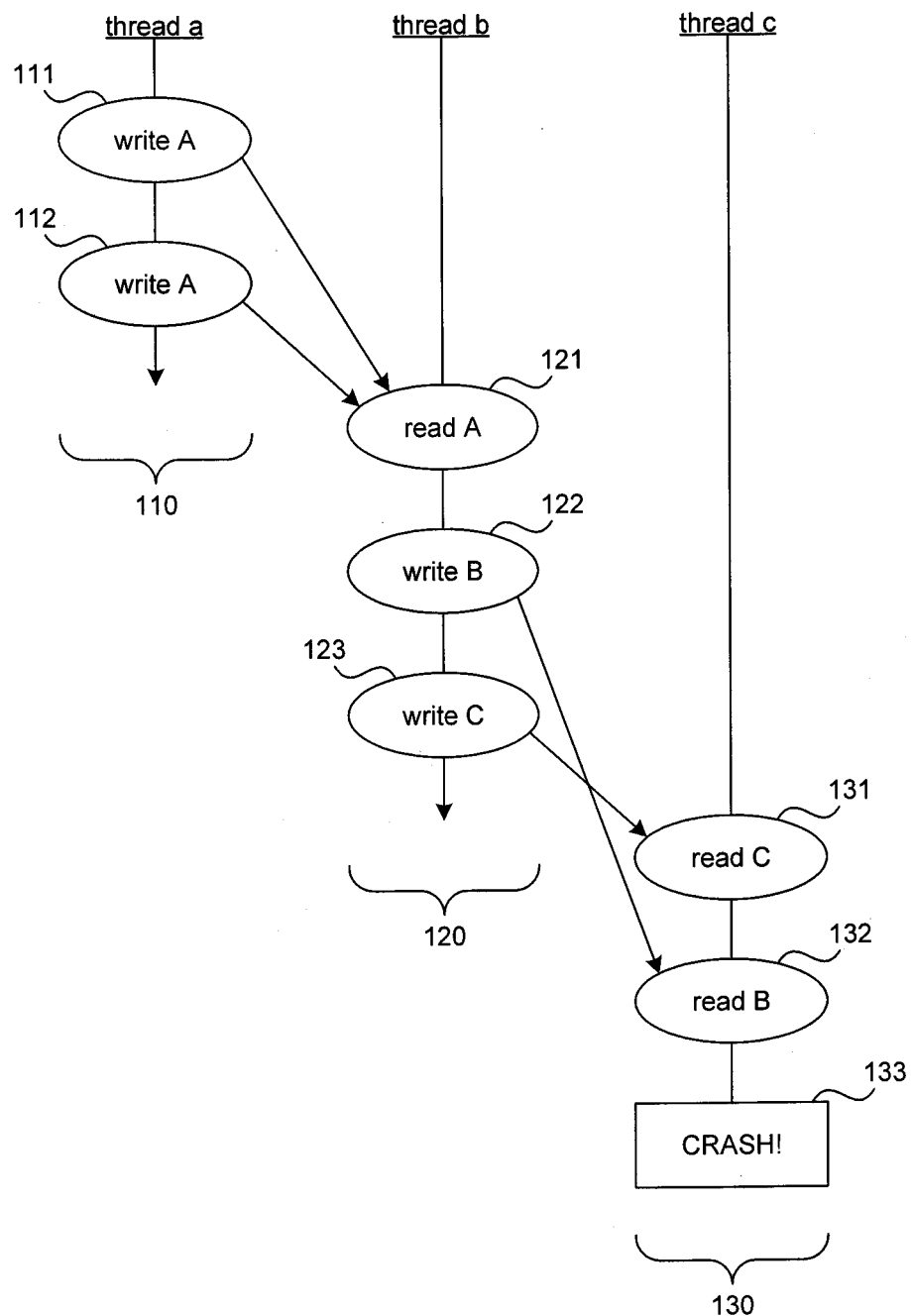
FIG. 1 is a thread execution diagram portraying communications between threads of a multi-threaded program that may lead to a crash of one of these threads.

The inventors have observed that it is common for multithreaded programs to suffer from concurrency errors. In particular, the inventors have observed that many concurrency errors occur when a first thread of a program executes portions of the program in such an order relative to a second thread's execution of portions of the program that the first program sets a variable to a value that causes the second thread to crash. In such a scenario, conventional debuggers typically show useful information for the crashed second thread, such as the position in the program at which it crashed. However, as the first thread that triggered the crash of the second thread continues to execute after the crash, the state of the first thread reflected by the debugger continues to change after the crash, making it difficult to discern the state of the first thread that caused the second thread to crash. Crashes that are produced as the result of the interaction of larger groups of threads can be even more difficult to diagnose using conventional techniques. Based on these observations, the inventors determined that a facility would have significant utility that, when a thread of a multithreaded program crashed, enabled a programmer or tester to obtain consistent state information about each other thread at a point at which the thread may have caused the crash.

Accordingly, a software and/or hardware facility for establishing a useful debugging state for a multithreaded computer program ("the facility") is provided that, in response to the crash of one of the threads of a multithreaded program, for each other thread, determines the point in the thread's execution at which it may have affected the state of the crashing thread and makes the thread's state at this position in the program available through a debugger.

In some embodiments, the facility employs a system of vector clocks that track, for each thread, the most recent state of each of the other threads that it could have been made aware of by communications from the other thread. In this approach, the facility identifies the latest stop point for each non-crashing thread that is expected to reproduce the crash.

In some embodiments, the facility employs a system of enhanced vector clocks, or "communicating write lists," that track, for each thread, a plurality of states of each of the other threads that could have been made aware of by communications from the other thread. The facility can use this technique in order to identify, for each non-crashing thread, one or more stopping points that may reproduce the crash.

In maintaining such vector clocks or enhanced vector clocks, the facility regards any write to a memory region by a first thread that is followed by a read from the same memory region by a second thread as a communication from the first thread to the second thread. At various stages, the facility may define different sizes for such regions, such as a page of memory or a word of memory. The facility uses the vector clock of the crashing thread at the time of the crash to determine the state of each of the other threads that is likely to have caused the crash.

In some embodiments, the facility executes the program multiple times in order to refine its determination of the positions in which the other threads may have caused the crash. For example, in some embodiments, the facility executes the program three times. The first time, the facility maintains vector clocks for the threads for which communications are defined as accesses to the same pages until one of the threads crashes. Afterwards, the facility identifies the pages that were accessed by threads in a write-read pattern during the first execution. In the second execution, the facility maintains vector clocks for the threads for which communications are defined as accesses to the same memory words until one of the threads crashes. After the second execution, the facility identifies threads other than the crashing thread having a nonzero time in the crashing thread's clock vector. For each of the identified threads, the facility establishes a stopping point immediately after the time for the identified thread in the crashing thread's clock vector. For any threads other than the crashing thread and the identified threads, the facility establishes a stopping point immediately after the thread starts. In the third execution, the facility executes the crashing thread to its crashing point, and each of the identified threads to its stopping point. The user may then examine each of the threads at its crashed or stopping point to determine the likely cause of the crash, such as by using a debugger. In particular, the user can examine thread-specific information, such as program counter, register states, and stack, as well as global state including the contents of memory shared by the threads of the program.

In various embodiments, the facility employs various techniques to ensure that, in each of the three executions of the programs, the threads execute in the same relative order throughout the execution of the program, including the techniques—some of them referred to as techniques for "deterministic multiprocessing"—described in one or more of the applications incorporated herein by reference.

In various embodiments, the facility employs various definitions of crashing behaviors. For example, in some embodiments, crashes can be defined to include dereferencing unmapped memory, aborting execution, raising exception, triggering a breakpoint, or any other detectable event or condition that is identified as being of interest.

FIG. 1 is a thread execution diagram portraying communications between threads of a multi-threaded program that may lead to a crash of one of these threads. In particular, FIG. 1 portrays the execution of three threads, threads a, b, and c. In each of instructions 111 and 112, thread a writes to location A. After the second of these writes, thread b reads from location A in instruction 121. Each of the two combinations of a write to location A by thread a followed by the read of location A by thread b can constitute a communication, indicated by an arrow from the write by thread a to the read by thread b. After its read of location A in instruction 121, thread b writes to location B in instruction 122, then writes to location C in instruction 123. Thread c subsequently reads from location C in instruction 131 and reads from location B in instruction 132. Here too, arrows indicate possible communications from thread b to thread c, corresponding to instances in which thread c reads from a location after it is written to by thread b. After instruction 132, thread c crashes. This crash by thread c may have been produced by activity of thread a and/or thread b each up through the last instruction that constitutes a communication, directly or indirectly, to thread c. These are instructions 122 and 123 executed by thread b, and instructions 111 and 112 executed by thread a. These instructions are candidates for the facility to establish debugging states to enable a user to investigate the crash by thread c.

Figure 2:
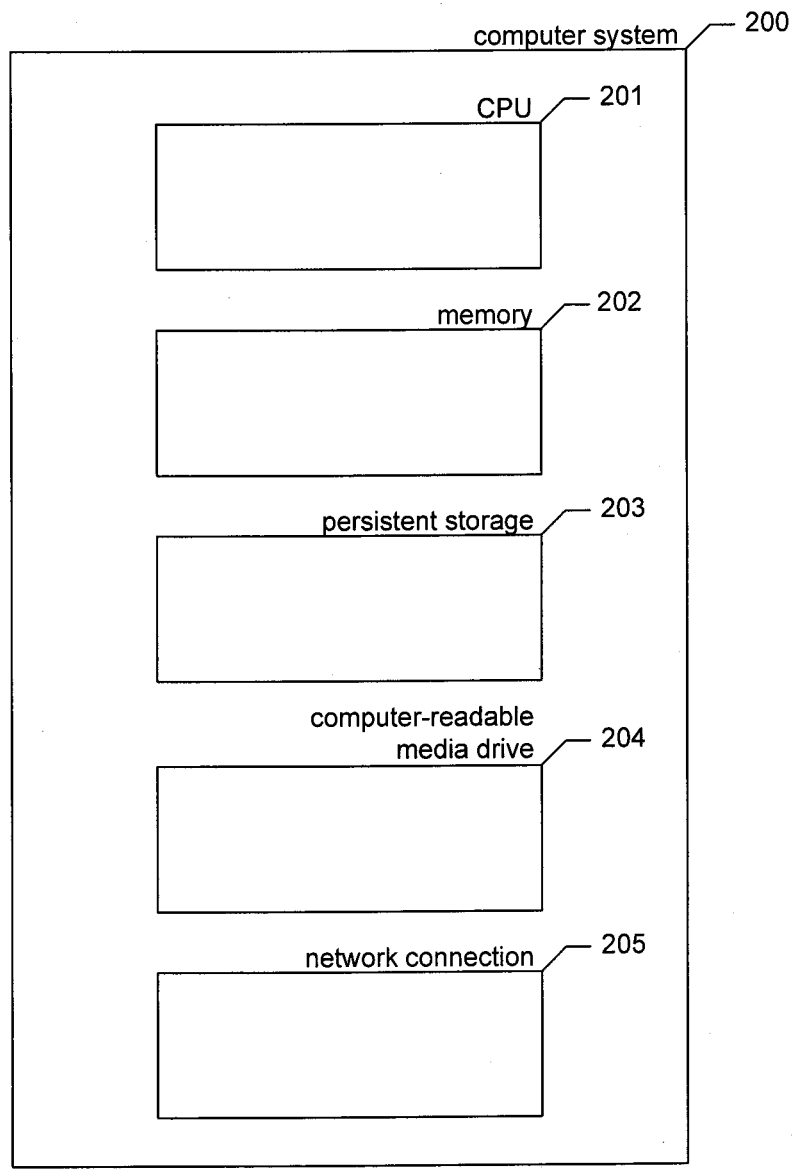
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including a multithreaded program being tested, a debugger, the facility, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware. In some embodiments, the facility incorporates a mechanism for observing and controlling the program being tested during its execution, such as a hypervisor implemented in a device driver or another type of thin hypervisor or other virtual machine hypervisor, operating system, machine simulator, binary rewriter, or transactional memory system or other hardware facilities. While computer systems configured as described above are typically used to support the operation of the facility, those skilled in the art will appreciate that the facility may be implemented using devices of various types and configurations, and having various components.

Figure 3:
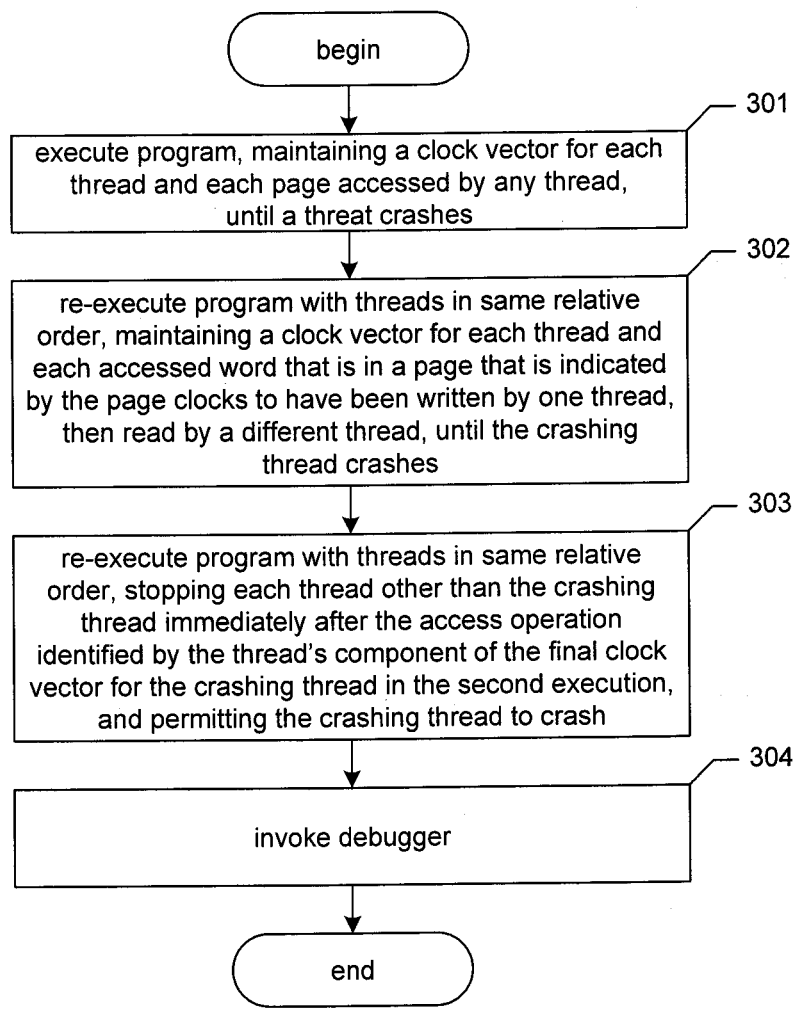
FIG. 3 is a flow diagram showing steps typically performed by the facility in some embodiments to detect the crash of a thread of a multithreaded program, and identify an appropriate point at which to present the other threads of the program in a debugger
Figure 4:
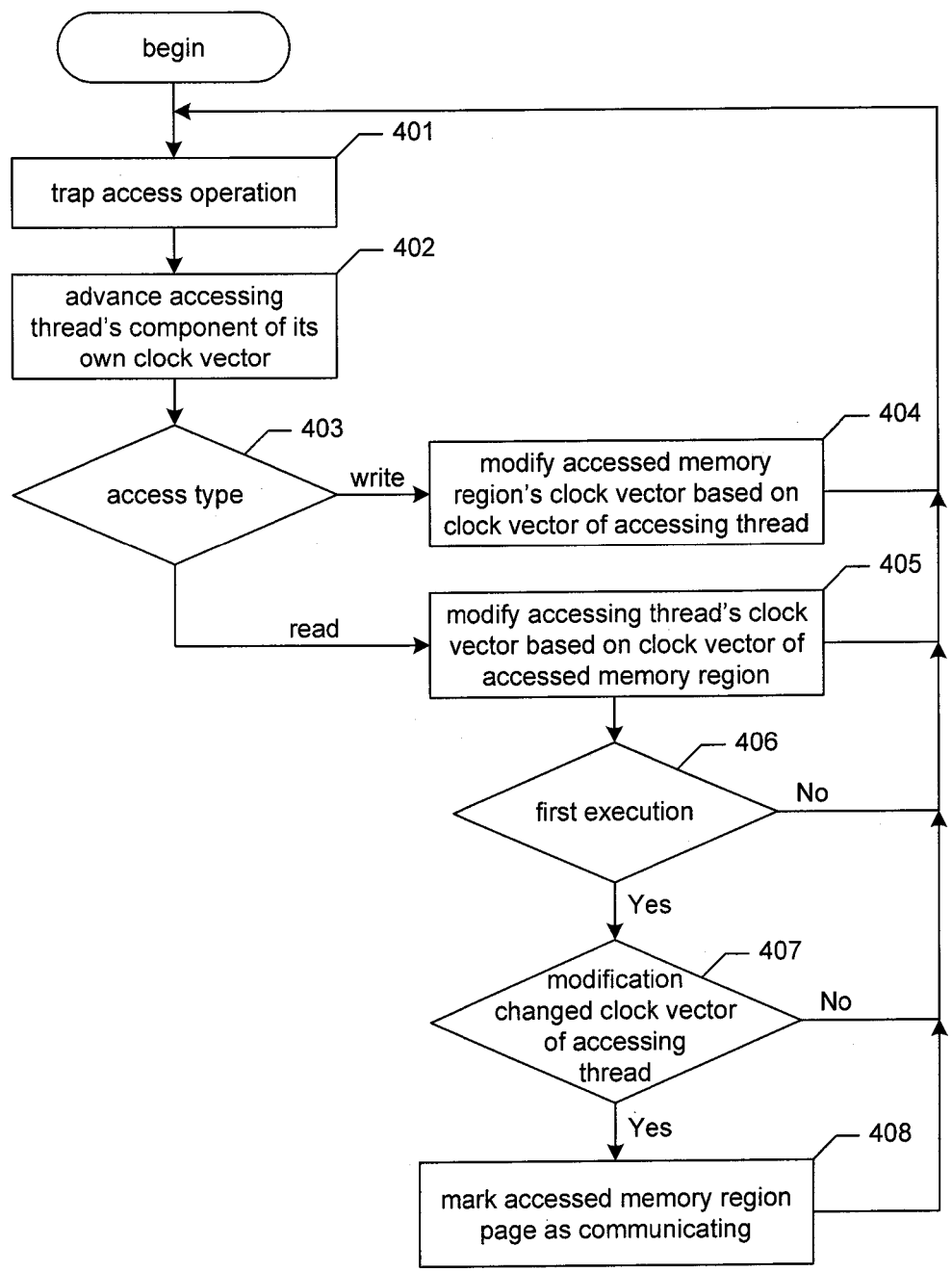
FIG. 4 is a flow diagram showing steps typically performed by the facility in some embodiments to maintain clock vectors for the program's threads and memory regions accessed by the program's threads during a single execution of the program

FIGS. 3 and 4 are flow diagram showing the operation of the facility. FIG. 3 is a flow diagram showing steps typically performed by the facility in some embodiments to detect the crash of a thread of a multithreaded program, and identify an appropriate point at which to present the other threads of the program in a debugger. In step 301, the facility executes the program a first time, maintaining a clock vector for each thread and for each page accessed by any thread, until a thread crashes. In some embodiments, before beginning the execution of step 301, the facility stores a state of the program, enabling the program to be re-executed from the same point in the future.

FIG. 4 is a flow diagram showing steps typically performed by the facility in some embodiments to maintain clock vectors for the program's threads and memory regions accessed by the program's threads during a single execution of the program. In step 401, the facility traps an access operation to an accessed memory region by an accessing thread. In some embodiments, the facility performs this trapping in a hypervisor on top of which the program is executing. In various embodiments, the facility performs this trapping inside the operating system kernel, or in the processor. In some embodiments, the facility performs this trapping when the thread reaches the access operation, but before the access operation is actually completed. In some embodiments, the access operation can be a read, a write, or a more complex operation such as an operation to acquire or release a synchronization mechanism, which is treated as both a read and a write. In various embodiments, operations treated by the facility as both read and write include operations such as atomic compare and swap instructions, and writes that are tracked at the page level. In some embodiments, when the steps of FIG. 4 are performed as part of step 301, the accessed memory region is treated as the page of memory containing the accessed location; when the steps of FIG. 4 are performed as part of step 302, the accessed memory region is treated as the word of memory at the accessed location. In some embodiments, this trapping is performed only with respect to certain memory access operations, such as memory access operations with respect to memory locations in certain memory pages or memory words. The remaining steps of FIG. 4 can be better understood in the context of FIG. 5.

FIGS. 5 and 6 are sample clock vector diagrams that show how the facility maintains clock vectors for a program's threads and memory regions accessed by them in some embodiments. FIG. 5 is a sample clock vector diagram that shows how the facility maintains clock vectors for a sample program's threads and memory pages accessed by them in some embodiments as part of step 301. The clock vector diagram comprises a table 500 that indicates the state of clock vectors 520 and the three threads 510 as the program executes over time. The table is indexed by an absolute time column 501. In some embodiments, the facility makes no effort to maintain an absolute time or correlate local times with such an absolute times; relative to these embodiments, absolute time 501 column is shown only to assist the reader in understanding the example presented. Columns 512, 514, and 516 show the memory access instructions executed by thread a, thread b, and thread c, respectively. These columns do not show instructions executed by the threads that are not memory access instructions. From these columns, it can be seen that no thread executes a memory access instruction at absolute time 0. Thread a executes memory access instructions at absolute times 1, 2, and 4; thread b executes memory access instructions at absolute times 2, 3, and 5; and thread c executes a memory access instruction at absolute time 4. The facility maintains for each thread a local time that indicates the number of memory access instructions that have been performed by the thread. For example, it can be seen that thread b's first memory access instruction occurs at absolute time 2, and is marked with local time 1*b*; thread b's second memory access instruction occurs at absolute time 3, and is marked with local time 2*b*; and thread b's third memory access instruction occurs at absolute time 5, and is marked with local time 3*b*. Of the clock vectors 520, each clock vector contains three components each corresponding to one of the threads. For example, in the clock vector state <1*a*, 2*b*, 0*c*> occurring at absolute time 3 in column 522, the first component, 1*a*, corresponds to thread a; the second component, 2*b*, corresponds to thread b; and the third component, 0*c*, corresponds to thread c. In particular, this state of the clock vector for thread b indicates that, at absolute time 3, based upon memory access operations performed by the threads up until absolute time 3: it is possible that thread b has been influenced by processing of thread a up through the memory access instruction at local time 1*b* (absolute time 1); it is possible that thread b has been influenced by its own processing through the memory access instruction at local time 2*b* (absolute time 3); and it is not possible that thread b has yet been influenced by any processing of thread c. Where the state of a particular clock vector does not change at a particular absolute time, the box at that absolute time in the clock vector's column is blank. For example, because the state of the clock vector for thread a does not change at absolute time 3, the box at absolute time 3 in column 521 is blank, which should be understood to mean that the clock vector for thread a at absolute time 3 remains <2*a*, 0*b*, 0*c*> from absolute time 2.

Returning to FIG. 4, in step 402, the facility advances the accessing thread's component of its own clock vector to reflect the access operation of the accessing thread trapped in step 401. Step 402 is reflected in two ways in the clock vector diagrams. First, the local time for the accessing thread is incremented. For example, for the memory access instruction performed by thread a at absolute time 1, the local time for thread a in column 511 is incremented from 0*a* to 1*a*. Second, the component of the clock vector for the accessing thread that corresponds to the accessing thread is set equal to the incremented local time for the accessing thread. To continue the example, for the memory access instruction performed by thread a at absolute time 1, the clock vector for accessing thread a in column 521 is changed from <0*a*, 0*b*, 0*c*> to <1*a*, 0*b*, 0*c*>, such that its first component corresponding to accessing thread a is set equal to local time 1*a* for thread a. In the clock vector diagrams, the result of step 402 is shown in the top half of the appropriate box in the appropriate clock vector column. For example, where the trapped access operation is the access operation performed at absolute time 2 by thread b, the result of step 402 is shown in the top half of the box at absolute time 2 in column 522, <0*a*, 1*b*, 0*c*>.

Returning to FIG. 4, in step 403, the facility determines the type of memory access operation that the accessing thread is performing; if the performed access operation is a write, then the facility continues in step 404; if the performed access operation is a read, then the facility continues in step 405. As mentioned above, the facility treats some complex memory access operations as both a read and a write, and so continues at both step 404 and step 405.

In step 404, the facility modifies the clock vector for the accessed memory region based upon the clock vector of the accessing thread. In particular, the facility sets the clock vector for the accessed memory region to be the component-wise maximum of the current clock vector for the accessed memory region and the clock vector of the accessing thread. Component-wise maximum means that, to construct the result clock vector, for each component of the input clock vectors, the times contained in that component of the input clock vectors are compared, and the later time is selected. The facility performs step 404 as a recognition that, by writing information to the accessed memory region, the accessing thread could have stored in the accessed memory region information that is based on its current state, or the state of any other thread of which the accessing thread is currently aware. This information may be later obtained and used by any thread that subsequently reads the accessed memory region. In the clock vector diagrams, the result of step 404 is shown in the bottom half of the appropriate box in the appropriate clock vector column. For example, for the access operation performed at absolute time 3 by thread b that involves writing to variable B on page 2, the facility determines the new clock vector state <2*a*, 2*b*, 0*c*> for page 2 at absolute time 3 in column 525 by performing a component-wise maximum of the clock vector state for page 2 at absolute time 2, <2*a*, 0*b*, 0*c*>, and the clock vector state for thread b at absolute time 3, <1*a*, 2*b*, 0*c*>. In some embodiments, if a clock vector does not exist for the accessed memory region, the facility creates and initializes a new clock vector for the accessed memory region as part of step 404. After step 404, the facility continues in step 401 to trap the next access operation.

In step 405, the facility modifies the clock vector of the accessing thread based upon the clock vector of the accessed memory region. In particular, the facility sets the clock vector for the accessing thread to be the component-wise maximum of the current clock vector for the accessing thread and the clock vector for the accessed memory region. The facility performs step 405 as a recognition that, by reading information from the accessed memory region, the accessing thread could have obtained and used information stored in the accessed memory region by any earlier writer to the accessed memory region that reflects the writing thread's state on writing, as well as the state of any other thread of which the writing thread is then aware. In the clock vector diagrams, this result of step 405 is shown in the bottom half of the appropriate box in the appropriate clock vector column. For example, for the access operation performed at absolute time 5 by thread b that involves reading from variable C on page 1, the facility determines the new clock vector state <3a, 3b, 0c> for thread b in the bottom half of the box for absolute time 5 in column 522 by performing a component-wise maximum of the current clock vector state for accessing thread b in the top half of the box for absolute time 5 in column 522, <1a, 3b, 0c>, and the clock vector state for page 1, <3a, 0b, 0c>.

In step 406, if the current execution is the first execution, i.e., if the steps of FIG. 4 are being performed in this iteration as part of performing step 301, then the facility continues in step 407, else the facility continues in step 401 to trap the next access operation. In step 407, if the modification of the clock vector for the accessing thread performed in step 405 changed the state of the clock vector for the accessing thread, then the facility continues in step 408, else the facility continues in step 401 to trap the next access operation. In step 408, because the accessed memory region page was earlier written by thread other than the accessing thread and has now been read by the accessing thread, the facility marks the accessed memory region page as a communicating page, so that accesses to words within the accessed memory region page in future executions will be trapped. After step 408, the facility continues in step 401 to trap the next access operation. In some embodiments, the facility omits steps 406-408, and traps all accesses to words in future executions.

Returning to FIG. 3, step 301 completes when one of the threads crashes. At this point, the state of the clock vector for the crashing thread reflects a rough indication about the points at which the threads other than the crashing thread may have caused the crash of the crashing thread. In particular, the final state <2a, 2b, 2c> of crashing thread c shown at absolute time 5 in column 523 indicates that thread a may have caused the crash by its memory access instruction at its local time 2a (absolute time 2)—that is, thread a could not have caused the crash by its actions after absolute time 2—and thread b may have caused the crash by its memory access instruction at its local time 2 (absolute time 3)—that is, that thread b could not have caused the crash by its actions after absolute time 3. The facility further refines these points in step 303 based upon the results obtained from step 302.

In some embodiments, in step 301, rather than maintaining clocks for memory pages, the facility maintains clocks for arbitrarily-defined regions of memory, and/or for cache lines.

In step 302, the facility executes the program a second time, starting at the same starting point as in the execution of step 301, with each of the program's threads executing in the same relative order as the first time, and maintaining a clock vector for each thread of the program and each accessed word in one of the pages marked in step 408, until the crashing thread again crashes. The facility performs the clock maintenance of step 302 using the steps shown in FIG. 4. When the steps of FIG. 4 are performed as part of step 302, the accessed memory regions whose clocks are modified in step 404 and read in step 405 are words rather than pages. At the conclusion of step 302, when the crashing thread crashes, the state of the clock vector for the crashing thread reflects a refined indication about the points at which the threads other than the crashing thread may have caused the crash of the crashing thread.

FIG. 6 is a sample clock vector diagram that shows how the facility maintains clock vectors for the sample program's threads and memory words accessed by them in some embodiments as part of step 302. It can be seen that, rather than containing columns 524-525 showing the state of clock vectors for pages 1-2 as table 500 does, table 600 contains columns 624-627 showing the state of clock vectors for words (or "variables") A-D. As the result of maintaining clock vectors for individual words, the facility is able to obtain a more refined result when compared to the result of step 301 shown in FIG. 5. In particular, the final state <1a, 2b, 2c> of crashing thread c shown at absolute time 5 in column 623 indicates that thread a may have caused the crash by its memory access instruction at its local time 1a (absolute time 1), and thread b may have caused the crash by its memory access instruction at its local time 2b (absolute time 3). This refinement with respect to thread a is the result of tracking memory accesses more finely at the word level rather than more coarsely at the page level.

This result can be understood in accordance with the following analysis: By reviewing column 616, it can be seen that thread c read only a single variable through which it could have been communicated to by other threads: variable B. The only other thread that wrote to variable B is thread b, at local time 2b and absolute time 3. Accordingly, the facility selects the point after local time 2b and absolute time 3 at which to stop thread b. However, by writing variable A at absolute time 1, thread a communicated to thread b, which subsequently read variable A at absolute time 2. As this communication from thread a to thread b via variable A could have affected the communication from thread b to thread c via a variable B, the facility deems thread a to have indirectly communicated to thread c at its local time 1a, absolute time 1. The facility therefore selects the point after local time 1a, absolute time 1 at which to stop thread a.

In step 303, the facility executes a program a third time, starting at the same starting point as in the executions of steps 301 and 302, with each of the program's threads executing the same relative order at the first and second times, stopping each thread other than the crashing thread immediately after the access operation identified by the thread's component of the final clock vector for the crashing thread in the second execution performed in step 302, and permitting the crashing thread to again crash. In some embodiments, step 303 involves trapping each memory access operation by the threads other than the crashing thread; determining whether the trapped memory access operation by the thread is the memory access operation by the thread indicated by the thread's component of the final clock vector for the crashing thread; and, if so, taking action that causes the thread to halt after completing the memory access operation. In various embodiments, the action taken by the facility that causes the thread to halt after completing the memory access operation is: on an x86 processor, injecting a #DB vector 1 interrupt; marking the thread as not running past that point; causing the CPU to wait in a busy loop until the current memory transaction has completed; rewriting the code being executed by the thread to include an explicit breakpoint; rescheduling the threads; or throwing a special type of exception. In some embodiments, if a thread's component of the final clock vector for the crashing thread is 0, the facility determines that it was not involved in the crash of the crashing thread, even indirectly, and stops the thread immediately after it is started.

In step 304, the facility invokes a debugger that enables the user to examine the state of the crashing thread and each of the stopped threads as a basis for identifying and correcting the error that produced the crash. After step 304, these steps conclude.

The usefulness of the clock vectors maintained by the facility is in some respects a function of the ability of the facility to accurately identify the order in which different threads access the same memory region. In some embodiments, where the facility would otherwise be unable to accurately discern the order in which threads access a memory region, the facility takes affirmative action to ensure that the correct order can be discerned, such as by permitting access to the memory region only by a single identified thread at a time. In some embodiments, where the facility is unable to clearly distinguish the order of access to a memory region, the facility behaves conservatively by treating the accesses as having been performed in every possible order for the purposes of maintaining clock vectors.

In some embodiments, after using the process described below to identify initial stop points for each thread that communicated directly or indirectly to the crashing thread, the facility repeats the third execution, experimentally advancing the stop point for one or more of the identified threads to earlier points in time to see if the crash is reproduced. In some embodiments, the facility uses intermediate states of one or more of the clock vectors, maintained in an execution transcript or another type of clock history, to select experimental stop points. If the crash is reproduced using a set of experimental stop points, in some embodiments, the facility presents to the user the state of the program with the identified threads stopped at their experimental stop points.

Figure 7B:
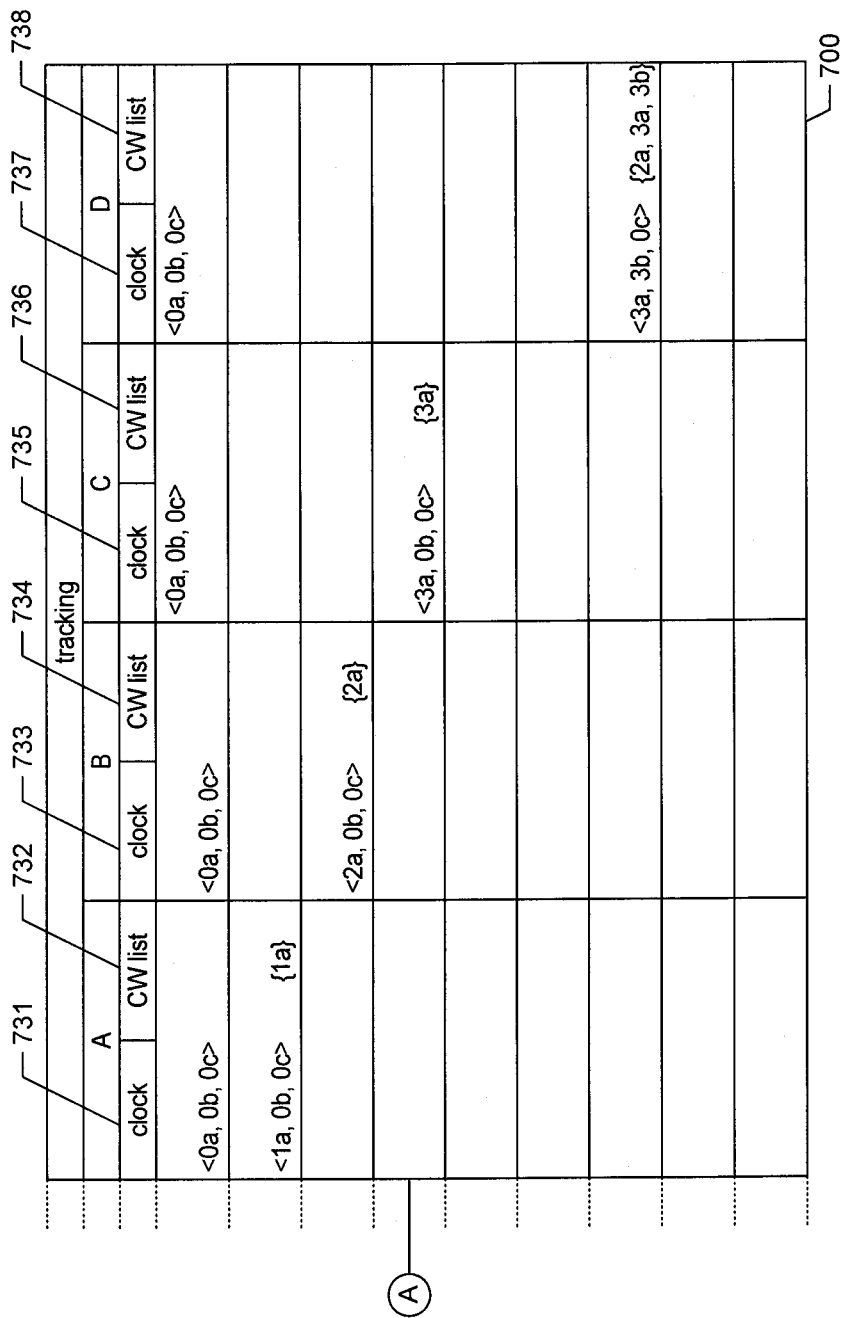
FIGS. 7 A and B together are a sample tracking diagram that shows how the facility uses enhanced vector clocks to track communicating writes that provide candidates for stop points before the initial stop points to see if a crash can be reproduced.

FIGS. 7A and B are a sample tracking diagram that shows how the facility uses enhanced vector clocks to track communicating writes that provide candidates for stop points before the initial stop points to see if a crash can be reproduced. Like FIG. 6, FIGS. 7A and B include an absolute time column 701; columns 711, 713, and 715 showing the local times for threads a, b, and c, respectively; columns 712, 714, and 716 showing the instructions executed by threads a, b, and c, respectively; columns 721, 723, and 725 showing the vector clock for threads a, b, and c, respectively; and columns 731, 733, 735, and 737 showing the vector clocks for words A-D. In addition, FIGS. 7A and B contain columns 722, 724, and 726 containing "communicating write lists" for threads a, b, and c, respectively; and columns 732, 734, 736, and 738 containing "communicating write lists" for words A-D, respectively. These communicating write lists tracked by the facility in some embodiments are lists of writes that have been read, directly or indirectly, by a particular thread. Ultimately, the communicating write list for the crashing thread contains a list of candidate points at which to stop non-crashing threads in an effort to identify stopping points earlier than the initial stopping points at which the crash can be reproduced.

The facility maintains a communicating write list for each of the threads, and each of the tracked memory locations. Each of these communicating write lists is initialized to be empty at the start of execution. Each time a thread writes to a memory location, the facility updates the communicating write list for the memory location by adding to the communicating write list for the memory location any items on the writing thread's communicating write list, as well as a new item corresponding to the writing thread's local time. For example, at absolute time 3, when thread a writes to location C, the facility updates location C's empty communicating write list with the items in thread a's communicating write list (here, none), as well as a new item corresponding to the local time $3a$ for thread a, yielding the communicating write list $\{3a\}$. As another example, at absolute time 6, where thread b writes to location D, location D's empty communicating write list is updated with items $2a$ and $3a$ from thread b's communicating write list, as well as a new item $3b$ corresponding to writing thread b's local time, yielding the communicating write list $\{2a, 3a, 3b\}$. The facility further maintains the communicating write lists by, when a thread reads a memory location, updating the thread's communicating write list by adding any items in the communicating write list for the read location. For example, at absolute time 5, when thread b reads location B, the facility updates thread b's communicating write list $\{3a\}$ by adding item $2a$ from read location B's communicating write list to obtain for thread b the new communicating write list of $\{2a, 3a\}$.

When a thread crashes, the facility uses the communicating write list for the crashing thread to identify earlier points in the execution of the non-crashing thread to test stopping the non-crashing threads to see if the crash recurs. In the example shown in FIG. 7, crashing thread c's communicating write list is $\{2a, 3a, 3b\}$. This leads the facility to test whether stopping thread a at local times $2a$ and $3a$ and stopping thread b at local time $3b$ results in reproducing the crash of thread c.

In some embodiments, the facility is adapted for use with programs—such as distributed programs—whose programmatic sub-entities communicate via explicit messages passed between them. In some such embodiments, the facility uses approaches such as those described above. In some such embodiments, the facility delays the sending by each programmatic sub-entity of each message after the first one to determine whether the post-recently sent message caused the crash of a different programmatic sub-entity.

In some embodiments in which the facility uses a transactional memory system, the facility takes a checkpoint of each thread or other programmatic sub-entity—such as task, process, etc.,—after it sends each message; establishes a new copy-on-write instance for the thread or other programmatic sub-entity, and performs a simulation of the thread or other programmatic sub-entity using the copy-on-write instance. When using a transactional memory system, in some embodiments, the facility is able to roll back the state of the program, rather than beginning a new execution cycle for the program in order to reach points in the processing of at least some of the threads that are earlier than their current points in processing. When using transactional memory systems implemented in hardware, in some embodiments, the facility causes the hardware to maintain the thread's logical times and/or maintain the state of the vector clocks.

Those skilled in the art will appreciate that the steps shown in FIGS. 3 and 4 may be altered in a variety of ways. For example, the order of the steps may be rearranged; some steps may be performed in parallel; shown steps may be omitted, or other steps may be included; a shown step may divided into substeps, or multiple shown steps may be combined into a single step, etc.

While FIGS. 5 and 6 show tables whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

The invention claimed is:

1. A method in a computing system for supporting the testing of a multithreaded program, comprising:
  during execution of the multithreaded program, detecting a crash of one of multiple threads of the multithreaded program;
  in response to detecting the crash, identifying a set of program execution points by identifying, for each of a plurality of threads other than the thread whose crash was detected, as a stopping point, a point in an execution of the thread during execution of the multithreaded program that is a candidate point for having caused the detected crash;

determining a final set of program execution points by:
for at least one selected thread of the plurality of threads other than the thread whose crash was detected:
updating, to an earlier stopping point, the identified stopping point for the selected thread, such that a unique combination of stopping points across the threads is defined, wherein the updating is based on an identification of a communication performed by the selected thread that was earlier in the execution of the multithreaded program than the identified stopping point for the selected thread;
in response to the updating, reexecuting the multithreaded program, stopping each of the plurality of threads other than the thread whose crash was detected at its determined stopping point in the unique combination of stopping points;
determining whether the crash recurs in the reexecution; and
when the crash recurs, modifying the set of program execution points such that the identified stopping point for the selected thread in the final set of program execution points is replaced with the earlier stopping point, wherein it is determined that the crash recurs for one or more of the at least one selected thread of the plurality of threads; and
when the crash does not recur, selecting the set of program execution points without the updated earlier stopping point as the final set of program execution points; and making available to a user aspects of a thread state for one or more of the plurality of threads other than the thread whose crash was detected, wherein the aspects of the thread state made available to a user are based on the final set of program execution points.

2. The method of claim 1 wherein the identification of the point in an execution of the thread during execution of the multithreaded program that is a candidate point for having caused the detected crash is performed for each thread by identifying a latest action of the thread before the detected crash that could have constituted a direct or indirect communication to the thread whose crash was detected.

3. The method of claim 2, wherein the identification of the point in an execution of the thread during execution of the multithreaded program that is a candidate point for having caused the detected crash is further performed for each of at least a portion of the threads other than the thread whose crash was detected by:
identifying an action that occurred before the latest action of the thread and that could have constituted a direct or indirect communication to the thread whose crash was detected.

4. The method of claim 3 wherein at least one identification of the communication performed by the selected thread is found by:
establishing a communicating write list for the thread whose crash was detected;
establishing a communicating write list for each of a set of memory resources;
in response to each write to a memory resource by the thread whose crash was detected, updating the communicating write list for the memory resource using the communicating write list for the thread whose crash was detected and a new item corresponding to the point in the execution of the thread whose crash was detected where the write is performed;
in response to each read from a memory resource by the thread whose crash was detected, updating the communicating write list for the thread whose crash was detected using the communicating write list for the memory resource; and
identifying the communication performed by the selected thread from among the items of the communicating write list of the thread whose crash is detected.

5. The method of claim 1 wherein an iteration of updating, to an earlier stopping point, and reexecuting is performed for every possible unique combination of stopping points for each of the plurality of threads, other than the thread whose crash was detected, through which execution passed before the crash was detected.

6. The method of claim 5 wherein the point in each thread's execution that is identified as part of the final set of program execution points is the earliest point in the execution of the thread at which the thread was stopped in any of the iterations in which it was determined that the crash recurred.

7. The method of claim 1 wherein aspects of the thread's state are made available to the user through a debugger.

8. The method of claim 1, further comprising making available to the user the contents of memory shared between the threads at a time when the thread whose crash was detected has crashed and the other threads have reached but not exceeded the points in their execution identified in the final set of program execution points.

9. A method, performed by a computing system, for supporting the debugging of a multithreaded program specifying a plurality of threads, the method comprising:
tracking, for multiple particular threads of the plurality of threads of the multithreaded program, a most recent state of each other threads that the particular thread could have been made aware of by communications from the other thread; and
in response to a crash of a selected one of the plurality of threads, reestablishing a final set of thread states by:
identifying, based on the tracking, a set of program execution points by selecting, for each of the multiple threads other than the selected thread, an event in the thread's execution that is a candidate event for having caused the detected crash;
for at least one distinguished thread of the plurality of threads other than the selected thread;
updating, to an earlier program execution point, the identified program execution point for the distinguished thread, such that a unique combination of program execution points across the threads is defined, wherein the updating is based on an identification of a communication performed by the distinguished thread that was earlier in an execution of the multithreaded program than the identified program execution point for the distinguished thread;
reexecuting the multithreaded program, stopping each of the plurality of threads other than the selected thread at the program execution point corresponding to that thread in the unique combination of program execution points, wherein the reexecution tracks a new set of most recent states of each of the other threads that the selected thread could have been made aware of by communications from the other thread; and determining whether the crash recurs in the reexecution;

when the crash recurs, modifying the set of program execution points such that the identified stopping point for the selected thread is replaced with the earlier stopping point, wherein it is determined that the crash recurs for one or more of the at least one selected thread of the plurality of threads; and when the crash does not recur, selecting, as the final set of thread states, at least one of the new sets of most recent states found for at least one distinguished thread of the plurality of threads; and making available the final set of thread states for examination by a human user.

10. The method of claim 9 wherein threads among the plurality of threads access a set of memory resources, and wherein each tracking is performed by:
  establishing a clock vector for each of the plurality of threads;
  establishing a clock vector for each of the set of memory resources;
  in response to each write to a memory resource by a thread, updating the clock vector for the memory resource using the clock vector for the thread; and
  in response to each read from a memory resource by a thread, updating the clock vector for the thread using the clock vector for the memory resource,
and wherein the method further comprises determining the states of the threads of the plurality of threads other than the selected thread to be reestablished based upon the state of the clock vector for the selected thread at the time of the crash of the selected thread.

11. The method of claim 10 wherein each memory resource of the set of memory resources is a memory page.

12. The method of claim 10 wherein each memory resource of the set of memory resources is a memory word.

13. The method of claim 10 wherein each memory resource of the set of memory resources is a memory location.

14. The method of claim 10 wherein each memory resource of the set of memory resources is a cache line.

15. A non-transitory computer-readable memory device having contents capable of causing a computing system to perform a method for supporting the analysis of a multithreaded program, the method comprising:
  during execution of the multithreaded program, detecting a crash of one of multiple threads of the multithreaded program;
  in response to detecting the crash, identifying a set of program execution points by identifying, for each of a plurality of threads other than the thread whose crash was detected, as an interruption point, a semantically meaningful point in an execution of the thread during execution of the multithreaded program;
  determining a final set of program execution points by:
    for at least one selected thread of the plurality of threads other than the thread whose crash was detected;
      updating, to an earlier interruption point, the identified interruption point for the selected thread, such that a unique combination of interruption points across the threads is defined, wherein the updating is based on an identification of a communication performed by the selected thread that was earlier in the execution of the multithreaded program than the identified interruption point for the selected thread;
      in response to the updating, reexecuting the multithreaded program, interrupting each of the plurality of threads other than the thread whose crash was detected at its determined interruption point in the unique combination of interruption points;
      determining whether the crash recurs in the reexecution; and
      when the crash recurs, modifying the set of program execution points such that the identified interruption point for the selected thread in the final set of program execution points is replaced with the earlier interruption point, wherein it is determined that the crash recurs for one or more of the at least one selected thread of the plurality of threads; and
      when the crash does not recur, selecting the set of program execution points without the updated earlier interruption point as the final set of program execution points; and
  making available to a user aspects of a thread state for one or more of the interrupted threads, wherein the thread state aspects made available to a user are based on the final set of program execution points.

16. The computer-readable memory device of claim 15 wherein at least one of the thread interruptions is performed using a hypervisor.

17. The computer-readable memory device of claim 15 wherein at least one of the thread interruptions is performed using a supervisor.

18. The computer-readable memory device of claim 15 wherein at least one of the thread interruptions is performed using an operating system.

19. The computer-readable memory device of claim 15 wherein at least one of the thread interruptions is performed using a binary rewriting system.

20. The computer-readable memory device of claim 15, further comprising causing a debugger to be invoked to enable exploration of the state of the threads upon interruption.

21. A method in a computing system for supporting the analysis of a multithreaded program, comprising:
  during execution of the program, for each of a plurality of communication pathways that are usable by threads to communicate to other threads or receive communications from other threads, monitoring the use of the communication pathway by threads of the program;
  detecting a crash event performed by one of the threads;
  identifying, using the results of the monitoring, a set of program execution points by identifying, for each distinguished thread of two or more of the threads other than the thread that performed the crash event, a last point in an execution of the distinguished thread of the program at which the distinguished thread could have communicated directly or indirectly to the thread that performed the crash event;
  determining a final set of program execution points by, for at least one selected thread of the two or more of the threads other than the thread whose crash was detected:
    storing a stopping point in an execution of the selected thread, wherein identification of the stored stopping point is based on an identification of a communication performed by the selected thread that was earlier in the execution of the selected thread than the program execution point, in the set of program execution points, for the selected thread;
    reexecuting the multithreaded program, stopping each of the two or more of the threads other than the thread whose crash was detected at its program execution point, in the set of program execution points;
    determining whether the crash recurs in the reexecution;

when the crash recurs, modifying the set of program execution points such that the stored stopping point for the selected thread replaces the program execution point, in the set of program execution points, for the selected thread; and when the crash does not recur, selecting the set of program execution points without the stored stopping point, as the final set of program execution points; and making at least a portion of a state of the computing system available for review at points corresponding to the final set of program execution points.

22. The method of claim 21 wherein the monitoring is performed using a clock vector for each thread and a clock vector for each communication pathway.

23. The method of claim 21 wherein at least a portion of the communication pathways are regions of memory accessible to at least a portion of the threads.

24. The method of claim 21 wherein at least a portion of the communication pathways are explicit message-passing mechanisms usable by at least a portion of the threads.

25. The method of claim 21 wherein the computing system comprises a plurality of machines, and wherein, for each of the machines, at least one thread of the program is executing on the machine, and wherein at least a portion of the communication pathways are network connections between the machines.

26. The method of claim 25 wherein the plurality of machines includes an identified machine on which at least two of the threads of the program are executing, and wherein the communication pathways also include at least one region of memory of the identified machine through which the threads of the program executing on the identified machine may communicate.

27. The method of claim 25 wherein at least two of the machines are physical machines.

28. The method of claim 25 wherein at least two of the machines are virtual machines.

29. A non-transitory computer-readable memory device having contents capable of causing a computing system to perform a method for supporting the analysis of a multiprocess program specifying a plurality of processes, the method comprising:

during execution of the program, for each of a plurality of communication pathways that are usable by processes to communicate to other processes or receive communications from other processes, monitoring the use of the communication pathway by processes of the program;

detecting a crash event performed by one of the processes;

identifying, using the results of the monitoring, a set of program execution points by identifying, for each distinguished process of two or more of the processes other than the process that performed the crash event, a last point in an execution of the distinguished process of the program at which the distinguished process could have communicated directly or indirectly to the process that performed the crash event;

determining a final set of program execution points by, for at least one selected process of the two or more of the processes other than the process whose crash was detected:

storing a stopping point in an execution of the selected process, wherein identification of the stored stopping point is based on an identification of a communication performed by the selected process that was earlier in the execution of the selected process than the program execution point, in the set of program execution points, for the selected process;

reexecuting the multithreaded program, stopping each of the two or more of the processes other than the process whose crash was detected at its program execution point, in the set of program execution points;

determining whether the crash recurs in the reexecution;

when the crash recurs, modifying the set of program execution points such that the stored stopping point for the selected process replaces the program execution point, in the set of program execution points, for the selected process; and when the crash does not recur, selecting the set of program execution points with the program execution point for the selected process instead of the stored stopping point, as the final set of program execution points; and making the state of the computing system available for review at the points corresponding to the stored identifications.

* * * * *

UNITED STATES PATENT AND TRADEMARK OFFICE
CERTIFICATE OF CORRECTION

PATENT NO. : 9,086,969 B2  
APPLICATION NO. : 12/969461  
DATED : July 21, 2015  
INVENTOR(S) : Bekiroglu et al.

Page 1 of 1

It is certified that error appears in the above-identified patent and that said Letters Patent is hereby corrected as shown below:

Specification

In column 1, line 15, delete "now." and insert -- now --, therefor.

In column 1, line 52, delete "debugger" and insert -- debugger. --, therefor.

In column 1, line 56-57, delete "program" and insert -- program. --, therefor.

Claims

In column 12, line 37, in claim 9, delete "threads" and insert -- thread --, therefor.

In column 12, line 48, in claim 9, delete "thread;" and insert -- thread: --, therefor.

In column 12, line 67, in claim 9, after "thread;" delete "and".

In column 13, line 56, in claim 15, delete "detected;" and insert -- detected: --, therefor.

Signed and Sealed this  
Sixteenth Day of February, 2016

Michelle K. Lee  
*Director of the United States Patent and Trademark Office*